United States Patent
King et al.

(10) Patent No.: US 8,594,441 B1
(45) Date of Patent: *Nov. 26, 2013

(54) COMPRESSING IMAGE-BASED DATA USING LUMINANCE

(75) Inventors: Gary C. King, San Jose, CA (US); Edward A. Hutchins, Mountain View, CA (US); Michael J. M. Toksvig, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 1254 days.

This patent is subject to a terminal disclaimer.

(21) Appl. No.: 11/520,144

(22) Filed: Sep. 12, 2006
(Under 37 CFR 1.47)

(51) Int. Cl.
*G06K 9/36* (2006.01)
*G06K 9/00* (2006.01)
*G06K 9/46* (2006.01)

(52) U.S. Cl.
USPC .......................................... 382/232; 382/166

(58) Field of Classification Search
USPC ................. 382/162–167, 232, 233, 253, 298; 345/430, 431, 503, 555, 582, 583, 587, 345/606, 608; 358/515, 518, 523, 525, 530
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,646,251 A | 2/1987 | Hayes et al. | |
| 4,682,664 A | 7/1987 | Kemp | |
| 4,685,071 A | 8/1987 | Lee | |
| 4,739,495 A | 4/1988 | Levine | |
| 4,771,470 A | 9/1988 | Geiser et al. | |
| 4,803,477 A | 2/1989 | Miyatake et al. | |
| 4,920,428 A | 4/1990 | Lin et al. | |
| 4,987,496 A | 1/1991 | Greivenkamp, Jr. | |
| 5,175,430 A | 12/1992 | Enke et al. | |
| 5,227,789 A | 7/1993 | Barry et al. | |
| 5,261,029 A | 11/1993 | Abi-Ezzi et al. | |
| 5,305,994 A | 4/1994 | Matsui et al. | |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Chaudhuri, "The impact of NACKs in shared memory scientific applications", Feb. 2004, IEEE, IEEE Transactions on Parallel and distributed systems vol. 15, No. 2, p. 134-150.

(Continued)

*Primary Examiner* — Amir Alavi

(57) ABSTRACT

Image-based data, such as a block of texel data, is accessed. The data includes sets of color component values. A luminance value is computed for each set of color components values, generating a range of luminance values. A first set and a second set of color component values that correspond to the minimum and maximum luminance values are selected from the sets of color component values. A third set of color component values can be mapped to an index that identifies how the color component values of the third set can be decoded using the color component values of the first and second sets. The index value is selected by determining where the luminance value for the third set lies in the range of luminance values.

20 Claims, 5 Drawing Sheets

(56) References Cited

U.S. PATENT DOCUMENTS

| | | | |
|---|---|---|---|
| 5,338,901 A | 8/1994 | Dietrich | |
| 5,387,983 A | 2/1995 | Sugiura et al. | |
| 5,414,824 A | 5/1995 | Grochowski | |
| 5,475,430 A | 12/1995 | Hamada et al. | |
| 5,513,016 A | 4/1996 | Inoue | |
| 5,608,824 A | 3/1997 | Shimizu et al. | |
| 5,652,621 A | 7/1997 | Adams, Jr. et al. | |
| 5,736,987 A | 4/1998 | Drucker et al. | |
| 5,793,371 A | 8/1998 | Deering | |
| 5,793,433 A | 8/1998 | Kim et al. | |
| 5,822,452 A * | 10/1998 | Tarolli et al. | 382/166 |
| 5,831,625 A * | 11/1998 | Rich et al. | 345/587 |
| 5,831,640 A | 11/1998 | Wang et al. | |
| 5,835,097 A | 11/1998 | Vaswani et al. | |
| 5,841,442 A | 11/1998 | Einkauf et al. | |
| 5,878,174 A | 3/1999 | Stewart et al. | |
| 5,892,517 A * | 4/1999 | Rich | 345/582 |
| 5,903,273 A | 5/1999 | Mochizuki et al. | |
| 5,963,984 A | 10/1999 | Garibay, Jr. et al. | |
| 5,995,109 A | 11/1999 | Goel et al. | |
| 6,016,474 A | 1/2000 | Kim et al. | |
| 6,052,127 A | 4/2000 | Vaswani et al. | |
| 6,078,331 A | 6/2000 | Pulli et al. | |
| 6,078,334 A | 6/2000 | Hanaoka et al. | |
| 6,111,988 A | 8/2000 | Horowitz et al. | |
| 6,118,547 A | 9/2000 | Tanioka | |
| 6,128,000 A | 10/2000 | Jouppi et al. | |
| 6,141,740 A | 10/2000 | Mahalingaiah et al. | |
| 6,151,457 A | 11/2000 | Kawamoto | |
| 6,175,430 B1 | 1/2001 | Ito | |
| 6,184,893 B1 | 2/2001 | Devic et al. | |
| 6,236,405 B1 * | 5/2001 | Schilling et al. | 345/582 |
| 6,252,611 B1 | 6/2001 | Kondo | |
| 6,256,038 B1 | 7/2001 | Krishnamurthy | |
| 6,281,931 B1 | 8/2001 | Tsao et al. | |
| 6,289,103 B1 | 9/2001 | Sako et al. | |
| 6,298,169 B1 * | 10/2001 | Guenter | 382/253 |
| 6,314,493 B1 | 11/2001 | Luick | |
| 6,319,682 B1 | 11/2001 | Hochman | |
| 6,323,934 B1 | 11/2001 | Enomoto | |
| 6,339,428 B1 * | 1/2002 | Fowler et al. | 345/582 |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,469,707 B1 | 10/2002 | Voorhies | |
| 6,486,971 B1 | 11/2002 | Kawamoto | |
| 6,504,952 B1 | 1/2003 | Takemura et al. | |
| 6,549,997 B2 | 4/2003 | Kalyanasundharam | |
| 6,556,311 B1 | 4/2003 | Benear et al. | |
| 6,584,202 B1 | 6/2003 | Montag et al. | |
| 6,594,388 B1 | 7/2003 | Gindele et al. | |
| 6,683,643 B1 | 1/2004 | Takayama et al. | |
| 6,707,452 B1 | 3/2004 | Veach | |
| 6,724,932 B1 | 4/2004 | Ito | |
| 6,737,625 B2 | 5/2004 | Baharav et al. | |
| 6,760,080 B1 | 7/2004 | Moddel et al. | |
| 6,785,814 B1 | 8/2004 | Usami et al. | |
| 6,806,452 B2 | 10/2004 | Bos et al. | |
| 6,819,793 B1 * | 11/2004 | Reshetov et al. | 382/166 |
| 6,839,062 B2 | 1/2005 | Aronson et al. | |
| 6,839,813 B2 | 1/2005 | Chauvel | |
| 6,856,441 B2 | 2/2005 | Zhang et al. | |
| 6,859,208 B1 | 2/2005 | White | |
| 6,876,362 B1 | 4/2005 | Newhall, Jr. et al. | |
| 6,883,079 B1 | 4/2005 | Priborsky | |
| 6,891,543 B2 | 5/2005 | Wyatt | |
| 6,900,836 B2 | 5/2005 | Hamilton, Jr. | |
| 6,940,511 B2 * | 9/2005 | Akenine-Moller et al. | 345/503 |
| 6,950,099 B2 | 9/2005 | Stollnitz et al. | |
| 7,009,639 B1 | 3/2006 | Une et al. | |
| 7,015,909 B1 | 3/2006 | Morgan, III et al. | |
| 7,023,479 B2 | 4/2006 | Hiramatsu et al. | |
| 7,081,898 B2 | 7/2006 | Sevigny | |
| 7,082,508 B2 | 7/2006 | Khan et al. | |
| 7,088,388 B2 | 8/2006 | MacLean et al. | |
| 7,092,018 B1 | 8/2006 | Watanabe | |
| 7,106,368 B2 | 9/2006 | Daiku et al. | |
| 7,107,441 B2 | 9/2006 | Zimmer et al. | |
| 7,116,335 B2 * | 10/2006 | Pearce et al. | 345/587 |
| 7,120,715 B2 | 10/2006 | Chauvel et al. | |
| 7,133,041 B2 | 11/2006 | Kaufman et al. | |
| 7,133,072 B2 | 11/2006 | Harada | |
| 7,146,041 B2 | 12/2006 | Takahashi | |
| 7,221,779 B2 | 5/2007 | Kawakami et al. | |
| 7,227,586 B2 | 6/2007 | Finlayson et al. | |
| 7,236,649 B2 * | 6/2007 | Fenney | 382/298 |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,397,946 B2 * | 7/2008 | Reshetov et al. | 382/166 |
| 7,447,869 B2 | 11/2008 | Kruger et al. | |
| 7,486,844 B2 | 2/2009 | Chang et al. | |
| 7,502,505 B2 | 3/2009 | Malvar et al. | |
| 7,519,781 B1 | 4/2009 | Wilt | |
| 7,545,382 B1 | 6/2009 | Montrym et al. | |
| 7,580,070 B2 | 8/2009 | Yanof et al. | |
| 7,627,193 B2 | 12/2009 | Alon et al. | |
| 7,671,910 B2 | 3/2010 | Lee | |
| 7,728,880 B2 | 6/2010 | Hung et al. | |
| 7,750,956 B2 | 7/2010 | Wloka | |
| 7,760,936 B1 | 7/2010 | King et al. | |
| 7,912,279 B2 | 3/2011 | Hsu et al. | |
| 8,049,789 B2 | 11/2011 | Innocent | |
| 8,238,695 B1 | 8/2012 | Davey et al. | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 | 11/2002 | Nguyen | |
| 2002/0169938 A1 | 11/2002 | Scott et al. | |
| 2002/0172199 A1 | 11/2002 | Scott et al. | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1 | 7/2003 | Kawamoto | |
| 2003/0142222 A1 | 7/2003 | Hordley | |
| 2003/0146975 A1 | 8/2003 | Joung et al. | |
| 2003/0167420 A1 | 9/2003 | Parsons | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0051716 A1 | 3/2004 | Sevigny | |
| 2004/0066970 A1 | 4/2004 | Matsugu | |
| 2004/0100588 A1 | 5/2004 | Hartson et al. | |
| 2004/0101313 A1 | 5/2004 | Akiyama | |
| 2004/0109069 A1 | 6/2004 | Kaplinsky et al. | |
| 2004/0151372 A1 | 8/2004 | Reshetov et al. | |
| 2004/0189875 A1 | 9/2004 | Zhai et al. | |

(56) References Cited

U.S. PATENT DOCUMENTS

| | | |
|---|---|---|
| 2004/0207631 A1 | 10/2004 | Fenney et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0073591 A1 | 4/2005 | Ishiga et al. |
| 2005/0099418 A1 | 5/2005 | Cabral et al. |
| 2005/0110790 A1 | 5/2005 | D'Amora |
| 2005/0111110 A1 | 5/2005 | Matama |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0268067 A1 | 12/2005 | Lee et al. |
| 2005/0286097 A1 | 12/2005 | Hung et al. |
| 2006/0004984 A1 | 1/2006 | Morris et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0133697 A1 | 6/2006 | Uvarov et al. |
| 2006/0153441 A1 | 7/2006 | Li |
| 2006/0176375 A1 | 8/2006 | Hwang et al. |
| 2006/0197664 A1 | 9/2006 | Zhang et al. |
| 2006/0259732 A1 | 11/2006 | Traut et al. |
| 2006/0259825 A1 | 11/2006 | Cruickshank et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0073996 A1 | 3/2007 | Kruger et al. |
| 2007/0091188 A1 | 4/2007 | Chen et al. |
| 2007/0106874 A1 | 5/2007 | Pan et al. |
| 2007/0126756 A1 | 6/2007 | Glasco et al. |
| 2007/0147706 A1 | 6/2007 | Sasaki et al. |
| 2007/0157001 A1 | 7/2007 | Ritzau |
| 2007/0168634 A1 | 7/2007 | Morishita et al. |
| 2007/0168643 A1 | 7/2007 | Hummel et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2007/0262985 A1 | 11/2007 | Watanabe et al. |
| 2007/0285530 A1 | 12/2007 | Kim et al. |
| 2008/0030587 A1 | 2/2008 | Helbing |
| 2008/0043024 A1 | 2/2008 | Schiwietz et al. |
| 2008/0062164 A1 | 3/2008 | Bassi et al. |
| 2008/0101690 A1 | 5/2008 | Hsu et al. |
| 2008/0143844 A1 | 6/2008 | Innocent |
| 2008/0263284 A1 | 10/2008 | da Silva et al. |
| 2009/0010539 A1 | 1/2009 | Guarnera et al. |
| 2009/0037774 A1 | 2/2009 | Rideout et al. |
| 2009/0116750 A1 | 5/2009 | Lee et al. |
| 2009/0128575 A1 | 5/2009 | Liao et al. |
| 2009/0160957 A1 | 6/2009 | Deng et al. |
| 2009/0257677 A1 | 10/2009 | Cabral et al. |
| 2009/0297022 A1 | 12/2009 | Pettigrew et al. |
| 2010/0266201 A1 | 10/2010 | Cabral et al. |

FOREIGN PATENT DOCUMENTS

| | | |
|---|---|---|
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 09233353 | 9/1997 |
| JP | 2000516752 | 12/2000 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006086822 | 3/2006 |
| JP | 2006094494 | 4/2006 |
| JP | 2006121612 | 5/2006 |
| JP | 2006134157 | 5/2006 |
| JP | 20060203841 | 8/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008113416 | 5/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007093864 | 8/2007 |

OTHER PUBLICATIONS

Laibinis, "Formal Development of Reactive Fault Tolerant Systems", Sep. 9, 2005, Springer, Second International Workshop, RISE 2005, p. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Non-Final Office Action, Mailed May 11, 2010; U.S. Appl. No. 11/591,685.
Final Office Action, Mailed Oct. 27, 2010; U.S. Appl. No. 11/591,685.
Restriction, Mailed Apr. 28, 2009; U.S. Appl. No. 11/592,076.
Notice of Allowance, Mailed Jan. 29, 2010; U.S. Appl. No. 11/592,076.
Notice of Allowance, Mailed May 4, 2010; U.S. Appl. No. 11/592,076.
Notice of Allowance, Mailed Aug. 13, 2010; U.S. Appl. No. 11/592,076.
Notice of Allowance, Mailed Nov. 26, 2010; U.S. Appl. No. 11/592,076.
Notice of Restriction, Mailed Aug. 10, 2010; U.S. Appl. No. 12/650,068.
Final Office Action, Mailed Mar. 16, 2010; U.S. Appl. No. 11/523,830.
Notice of Allowance, Mailed Jun. 28, 2010; U.S. Appl. No. 11/523,830.
Notice of Allowance, Mailed Sep. 2, 2010; U.S. Appl. No. 11/523,830.
Notice of Allowance, Mailed Jan. 20, 2011; U.S. Appl. No. 11/523,830.
Notice of Allowance, Mailed May 5, 2011; U.S. Appl. No. 11/523,830.
Final Office Action, Mailed Aug. 1, 2010; U.S. Appl. No. 11/586,756.
Notice of Allowance, Mailed Dec. 27, 2010; U.S. Appl. No. 11/586,756.
Notice of Allowance, Mailed May 12, 2011; U.S. Appl. No. 11/586,756.
Office Action, Mailed Apr. 27, 2009; U.S. Appl. No. 11/591,857.
Non-Final Office Action, Mailed Dec. 7, 2010; U.S. Appl. No. 11/591,857.
Notice of Allowance, Mailed Mar. 18, 2011; U.S. Appl. No. 11/591,857.
Final Office Action, Mailed Jun. 25, 2010; U.S. Appl. No. 11/592,106.
Non-Final Office Action, Mailed Dec. 16, 2010; U.S. Appl. No. 11/592,106.
Non-Final Office Action, Mailed Sep. 19, 2008; U.S. Appl. No. 11/523,926.

(56) References Cited

OTHER PUBLICATIONS

Final Office Action, Mailed Apr. 10, 2009; U.S. Appl. No. 11/523,926.
Non-Final Office Action, Mailed Oct. 1, 2009; U.S. Appl. No. 11/523,926.
Notice of Allowance; Mailed Mar. 29, 2010; U.S. Appl. No. 11/523,926.
Notice of Allowance; Mailed Jul. 9, 2010; U.S. Appl. No. 11/523,926.
Notice of Allowance; Mailed Oct. 27, 2010; U.S. Appl. No. 11/523,926.
Notice of Allowance; Mailed Jul. 21, 2010; U.S. Appl. No. 11/523,950.
Notice of Allowance; Mailed Nov. 3, 2010; U.S. Appl. No. 11/523,950.
Notice of Allowance, Mailed Jun. 22, 2009; U.S. Appl. No. 11/586,826.
Notice of Allowance, Mailed Dec. 14, 2009; U.S. Appl. No. 11/586,826.
Non-Final Office Action, Mailed May 27, 2010; U.S. Appl. No. 11/591,629.
Non-Final Office Action, Mailed Nov. 3, 2010; U.S. Appl. No. 11/591,629.
Final Office Action, Mailed Jun. 8, 2011; U.S. Appl. No. 11/591,629.
Non-Final Office Action, Mailed Apr. 28, 2010; U.S. Appl. No. 11/592,780.
Non-Final Office Action, Mailed Oct. 13, 2010; U.S. Appl. No. 11/592,780.
Final Office Action, Mailed Apr. 27, 2010; U.S. Appl. No. 11/588,177.
Non-Final Office Action, Mailed Apr. 27, 2010; U.S. Appl. No. 11/591,856.
Notice of Allowance, Mailed Nov. 12, 2010; U.S. Appl. No. 11/591,856.
Notice of Allowance, Mailed Mar. 9, 2011; U.S. Appl. No. 11/591,856.
Non-Final Office Action, Mailed Feb. 22, 2010; U.S. Appl. No. 11/586,825.
Notice of Allowance, Mailed Aug. 16, 2010; U.S. Appl. No. 11/586,825.
Notice of Allowance, Mailed Nov. 26, 2010; U.S. Appl. No. 11/586,825.
Notice of Allowance, Mailed Mar. 4, 2011; U.S. Appl. No. 11/586,825.
Loop, C., DeRose, T., Generalized B-Spline surfaces o arbitrary topology, Aug. 1990, SIGRAPH 90, pp. 347-356.
M. Halstead, M. Kass, T. DeRose; "efficient, fair interolation using catmull-clark surfaces"; Sep. 1993; Computer Graphics and Interactive Techniques, Proc; pp. 35-44.
Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.
Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.
Parhami, Computer Arithmetic, Oxford University Press, Jun. 2000, pp. 413-418.
S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
S. Erturk, "Real-Time Digital Image Stabilization Using Kalman Filters", http://www,ideallibrary.com, Real-Time Imaging 8, pp. 317-328, 2002.
T. DeRose, M., Kass, T. Troung; "subdivision surfaces in character animation"; Jul. 1998; Computer Graphics and Interactive Techniques, Proc; pp. 85-94.
Takeuchi, S., Kanai, T., Suzuki, H., Shimada, K., Kimura, F., Subdivision surface fitting with QEM-basd mesh simplificatio and reconstruction of aproximated B-Spline surfaces, 200, Eighth Pacific Conference on computer graphics and applications pp. 202-2012.
Uomori et al., "Automatic Image Stabilizing System by Full-Digital Signal Processing", vol. 36, No. 3, pp. 510-519, Aug. 1990.
Uomori et al., "Electronic Image Stabiliztion System for Video Cameras and VCRS", J. Soc. Motion Pict. Telev. Eng., vol. 101, pp. 66-75, 1992.
"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. Mar. 3, 2005 pp. 436-444.
"Calibration and removal of lateral chromatic abberation in images" Mallon, et al. Science Direct Copyright 2006; 11 pages.
"Method of Color Interpolation in a Singe Sensor Color Camera Using Green Channel Seperation" WEERASIGHE, et al Visual Information Processing Lab, Motorola Austrailian Research Center pp. IV-3233-IV3236, 2002.
D. Doo, M. Sabin "Behaviour of recrusive division surfaces near extraordinary points"; September 197; Computer Aided Design; vol. 10, pp. 356-360, 1970.
D.W.H. Doo; "A subdivision algorithm for smoothing down irregular shaped polyhedrons"; 1978; Interactive Techniques in Computer Aided Design; pp. 157-165.
Davis, J., Marschner, S., Garr, M., Levoy, M., Filling holes in complex surfaces using volumetric diffusion, Dec. 2001, Stanford University, pp. 1-9.
Donald D. Spencer, "Illustrated Computer Graphics Dictionary", 1993, Camelot Publishing Company, p. 272.
Duca et al., "A Relational Debugging Engine for Graphics Pipeline, International Conference on Computer Graphics and Interactive Techniques", ACM SIGGRAPH Jul. 2005, pp. 453-463.
E. Catmull, J. Clark, "recursively enerated B-Spline surfaces on arbitrary topological meshes"; Nov. 1978; Computer aided design; vol. 10; pp. 350-355.
gDEBugger, graphicRemedy, http://www.gremedy.com, Aug. 8, 2006, pp. 1-18.
http://en.wikipedia.org/wiki/Bayer_filter; "Bayer Filter"; Wikipedia, the free encyclopedia; pp. 1-4.
http://en.wikipedia.org/wiki/Colorfilter_array; "Color Filter Array"; Wikipedia, the free encyclopedia; pp. 1-5.
http://en.wikipedia.org/wiki/Color_space; "Color Space"; Wikipedia, the free encyclopedia; pp. 1-4.
http://en.wikipedia.org/wiki/Color_translation; "Color Management"; Wikipedia, the free encyclopedia; pp. 1-4.
http://en.wikipedia.org/wiki/Demosaicing; "Demosaicing"; Wikipedia, the free encyclopedia; pp. 1-5.
http://en.wikipedia.org/wiki/Half_tone; "Halftone"; Wikipedia, the free encyclopedia; pp. 1-5.
http://en.wikipedia.org/wiki/L*a*b*; "Lab Color Space"; Wikipedia, the free encyclopedia; pp. 1-4.
http://Slashdot.org/articles/07/09/06/1431217.html.
http:englishrussia.com/?p=1377.
J. Bolz, P. Schroder; "rapid evaluation of catmull-clark subdivision surfaces"; Web 3D '02.
J. Stam; "Exact Evaluation of Catmull-clark subdivision surfaces at arbitrary parameter values"; Jul. 1998; Computer Graphics; vol. 32; pp. 395-404.
Keith R. Slavin; Application As Filed entitled "Efficient Method for Reducing Noise and Blur in a Composite Still Image From a Rolling Shutter Camera"; U.S. Appl. No. 12/069,669, filed Feb. 11, 2008.
Ko et al., "Fast Digital Image Stabilizer Based on Gray-Coded Bit-Plane Matching", IEEE Transactions on Consumer Electronics, vol. 45, No. 3, pp. 598-603, Aug. 1999.
Ko, et al., "Digital Image Stabilizing Algorithms Basd on Bit-Plane Matching", IEEE Transactions on Consumer Electronics, vol. 44, No. 3, pp. 617-622, Aug. 1988.
Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.
Kumar, S., Manocha, D., Interactive display of large scale trimmed NURBS models, 1994, University of North Carolina at Chapel Hill, Technical Report, p. 1-36.
Kuno et al. "New Interpolation Method Using Discriminated Color Correlation for Digital Still Cameras" IEEE Transac. On Consumer Electronics, vol. 45, No. 1, Feb. 1999, pp. 259-267.

\* cited by examiner

COMPRESSING IMAGE-BASED DATA USING LUMINANCE

RELATED UNITED STATES PATENT APPLICATIONS

This Application is related to U.S. patent application Ser. No. 11/520,066 by G. King et al., filed Sep. 12, 2006, and entitled "Decompressing Image-Based Data Compressed Using Luminance," assigned to the assignee of the present invention, and hereby incorporated by reference in its entirety.

FIELD OF THE INVENTION

Embodiments of the present invention generally relate to data processing. More specifically, embodiments of the present invention relate to data compression.

BACKGROUND ART

Texture data can be compressed (encoded) to reduce the amount of memory required to store textures and to reduce the bandwidth needed to read the textures. One commonly used texture compression scheme is S3 Texture Compression (S3TC), also referred to as DirectX Texture Compression (DXTC or DXTn). "True-color" images use eight (8) bits for each set of red (R), green (G) and blue (B) components in a texel—24 bits per texel and 384 bits for a four-by-four (4×4) block of 16 texels. With S3TC, a block of texel data can be reduced to 64 bits, a compression ratio of six-to-one.

This is accomplished in S3TC by first using the 16 "RGB-tuples" (a set of RGB component values that describe a color) in a 4×4 block of texels to calculate two (2) representative colors C0 and C1, which are stored as 16 bits each (32 bits total) in RGB565 format. More specifically, the representative colors C0 and C1 are computed as the eigenvalues of the inertia tensor matrix defined by the 16 texels in a 4×4 block.

Each of the 16 RGB-tuples is then mapped to a line in RGB space that has the representative colors C0 and C1 as endpoints. Each RGB-tuple is associated with an index value depending on where the set of colors falls on that line. More specifically, the indices are computed by finding the perpendicular intersection between the line in RGB space and a line to each texel's colors. The 16 indices can each be represented using 2 bits—an additional 32 bits and a total of 64 bits per 4×4 block.

Although S3TC effectively compresses the data while maintaining the quality of the decoded (decompressed) image, the selection of the representative colors C0 and C1 and the computation of the indices can require relatively sophisticated processing.

SUMMARY OF THE INVENTION

Accordingly, a less complex compression scheme that still provides acceptable image quality would be advantageous. Embodiments in accordance with the present invention provide these and other advantages.

In one embodiment, image-based data, such as a block of texel data, is accessed. The data includes a plurality of sets of color component values (the sets may also be referred to as RGB-tuples, or "tuples" in general; each set of color component values describes a color). A luminance value is computed for each set of color component values, generating a range of luminance values. A first set and a second set of color component values, describing a first color and a second color, are selected from the sets of color component values. The first and second colors correspond to the minimum and maximum luminance values in the range of luminance values. A third set of color component values, describing a third color, can be mapped to an index. Generally speaking, the index identifies how the third color can be decoded (e.g., interpolated) using the first and second colors. The index value is selected by determining where the luminance value for the third color lies in the range of luminance values.

In one such embodiment, for each texel in a block of texels, each color component value is reduced in length. For example, for true-color (8 bit) values, each color component value is reduced to six (6) bits.

For each texel in the block of texels, a luminance value can be determined using the respective color component values (e.g., the R, G and B values) associated with the texel. In one embodiment, the luminance is computed as the dot product $0.299R+0.587G+0.114B$. In another embodiment, the dot product is computed in hardware using integer shifters and adders, as follows: the red value is left-shifted by one bit, the green value is left-shifted by two bits, and the luminance is determined by adding the resultant red and green values and the blue value.

In one embodiment, for each block of texels, the minimum and maximum luminance values are determined, and the tuples associated with the minimum and maximum luminance values are selected as the representative colors C0 and C1. The minimum and maximum luminance values are the endpoints of the range of luminance values. In one embodiment, the luminance value computed for each for each texel in the block is compared to the range of luminance values. In one such embodiment, an index value is associated with each tuple (and hence each texel) depending on where the luminance value computed using that tuple lies in the range of luminance values. The index value identifies how each tuple is to be interpolated using C0 and C1.

During decoding, the representative colors C0 and C1 and the index values are used to reconstruct the encoded sets of color component values, each set defining a color. More specifically, during decoding, sets of color component values are interpolated using the representative first and second sets of color component values, and the index values identify how the interpolation is to be performed.

Reconstructed images produced from raw (natural) image data that is compressed as described above are perceptually comparable in quality to reconstructed images produced according to S3TC. However, compression performed in accordance with embodiments of the present invention requires less sophisticated processing relative to S3TC. Furthermore, embodiments in accordance with the present invention are less costly in terms of both area and power consumption. Also, embodiments in accordance with the present invention can be readily implemented in hardware as well as software. Moreover, embodiments in accordance with the present invention are parallelizable and are compatible with existing S3TC engines. In addition, embodiments in accordance with the present invention allow applications to store runtime-generated images in a compressed format, reducing the amount of memory and bandwidth required for dynamic data, which can be of particular value on handheld platforms such as digital cameras.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
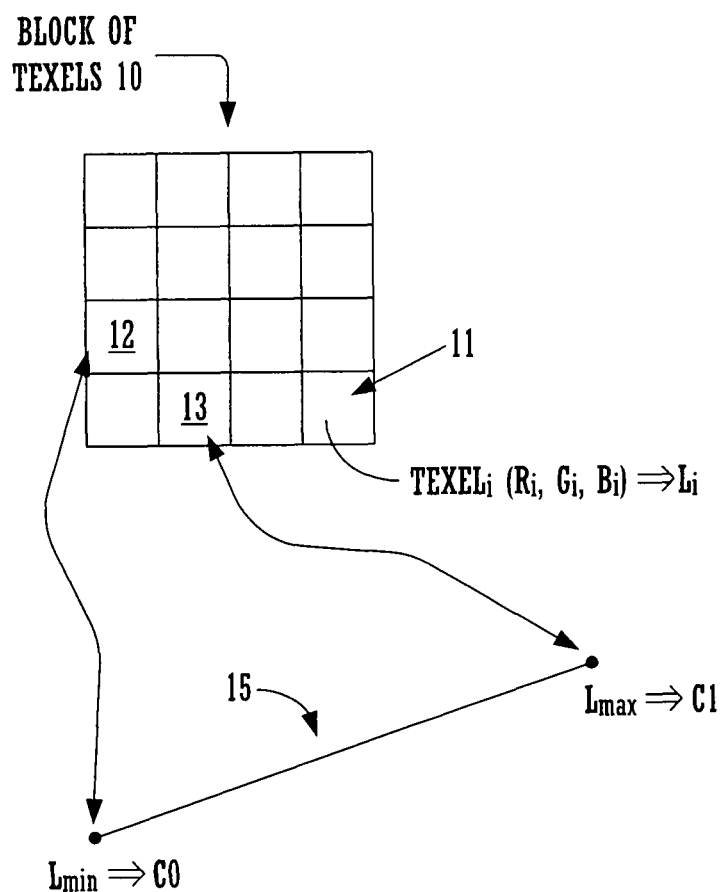
FIG. 1 illustrates a block of texels mapped to a range of luminance values according to an embodiment of the present invention.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "selecting," "encoding," "defining," "using," "determining," "computing," "shifting," "adding," "identifying," "reducing," "truncating," "associating," "comparing" or the like, refer to actions and processes (e.g., flowcharts 300 and 400 of FIGS. 3 and 4, respectively) of a computer system or similar electronic computing device or processor (e.g., system 500 of FIG. 5). The computer system or similar electronic computing device manipulates and transforms data represented as physical (electronic) quantities within the computer system memories, registers or other such information storage, transmission or display devices.

The descriptions and examples provided herein are discussed in the context of image-based data in general and texel data in particular; however, the present invention is not so limited. In general, the present invention, in its various embodiments, is also well-suited for use with pixel data, video data, still-image data, Web page-based data, graphics data and the like, and combinations thereof. In addition, the data may be multimedia data; for example, there may be audio data associated with the video data.

Embodiments in accordance with the present invention are applicable to, but not limited to, DXT1, DXT2, DXT3, DXT4 and DXT5. DXT1 does not include an alpha channel, and color data for a 4×4 texel is encoded in 64 bits. DXT2-5 include an alpha channel, and a 4×4 texel is encoded in 128 bits-64 bits are used for the alpha channel data and 64 bits are used for color data. The discussion below pertains to the encoding of the color data of DXT1-5.

FIG. 1 illustrates a block 10 of texture elements (texels) mapped to a range 15 of luminance values according to an embodiment of the present invention. Block 10 represents a portion of, for example, a frame of raw or natural (e.g., uncompressed) image data. In the example of FIG. 1, block 10 includes 16 texels arranged as a 4×4 array; however, the present invention is not so limited.

Texel 11 represents an example texel i. Associated with each texel i is a set of color component values (e.g., a tuple or RGB-tuple consisting of a red value $R_i$, a green value $G_i$, and a blue value $B_i$) that describe a color for that texel. In one embodiment, the color component values $R_i$, $G_i$ and $B_i$ are each 8 bits in length.

According to embodiments of the present invention, for a texel i, the color component values $R_i$, $G_i$ and $B_i$ are used to compute a luminance value $L_i$ for that texel. In one embodiment, before the luminance value is computed, the color component values $R_i$, $G_i$ and $B_i$ are reduced in length from 8 bits each to 6 bits each. In one such embodiment, this is accomplished by truncating the least significant bits from the color component values.

In S3TC, encoded color component values are stored in the RGB565 format (five [5] bits for the red and blue values, and 6 bits for the green value). Hence, by reducing the color component values from 8 bits to 6 bits, a level of precision that is at least equivalent to the minimum level of precision associated with S3TC is maintained.

In one embodiment, the luminance value $L_i$ is computed as the dot product $0.299R_i+0.587G_i+0.114B_i$ (equation 1). In another embodiment, the dot product is computed as follows: the red value $R_i$ is left-shifted by one (1) bit, the green value $G_i$ is left-shifted by 2 bits, and the luminance $L_i$ is determined by adding the resultant red and green values and the blue value $B_i$. In the latter embodiment, the coefficients of equation 1 are approximated as $2/7$, $4/7$ and $1/7$, respectively. An advantage of the latter embodiment is that it can be computed using integer shifters and adders and is thus readily implemented in hardware.

Luminance values can be determined from color component values in other ways. For example, the red and blue values can be disregarded, and the green value can be used as the luminance value.

Thus, a range 15 of luminance values is determined for each texel in the block 10 of texels. In the present embodiment, the minimum luminance value $L_{min}$ and the maximum luminance value $L_{max}$ in the range 15 are then identified. In the example of FIG. 1, the minimum luminance value is determined using the set of color component values (the RGB-tuple) associated with texel 12, and the maximum luminance value is determined using the set of color component values associated with texel 13. Accordingly, in the example of FIG. 1, the set of color component values associated with texel 12 is selected as representative color C0, and the set of color component values associated with texel 13 is selected as representative color C1. In one embodiment, the colors C0 and C1 are each truncated to RGB565 format.

Significantly, according to embodiments of the present invention, the representative colors C0 and C1 are not calculated as in S3TC. Instead, according to embodiments of the present invention, the representative colors C0 and C1 are selected from the existent set of colors associated with block 10 of texel data. That is, in the example of FIG. 1, there are 16 RGB-tuples (16 sets of color component values, each set describing a color) associated with block 10, and two of those sets (colors) are selected as C0 and C1. Because C0 and C1 are selected from, instead of calculated from, the existent RGB-tuples or colors associated with block 10, computational complexity is reduced.

Figure 2:
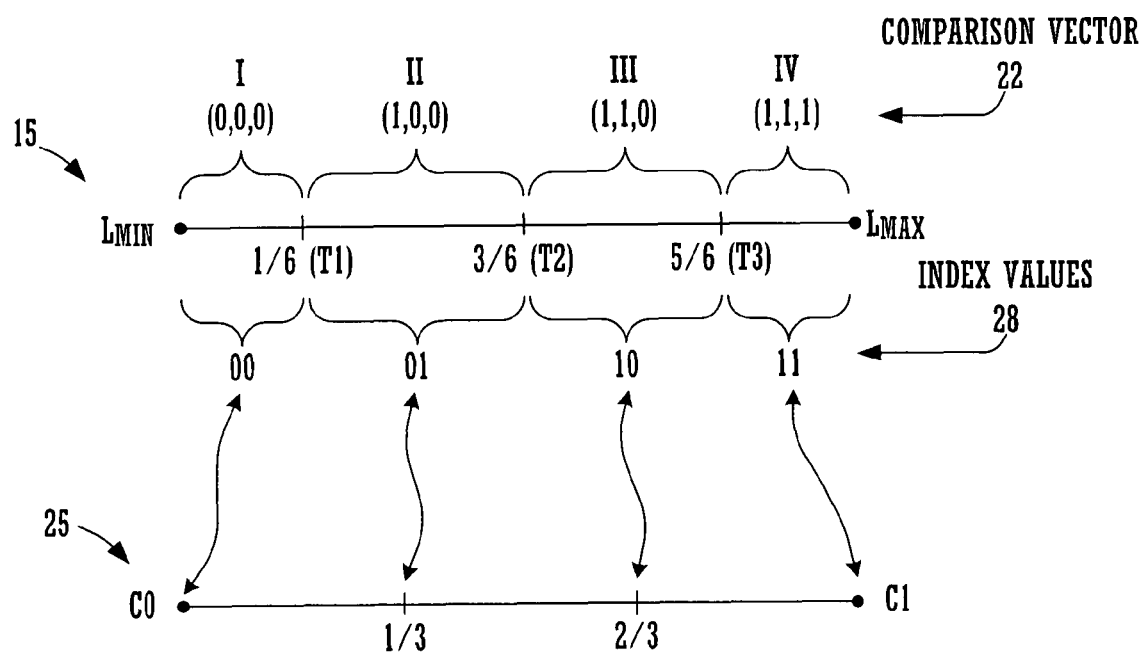
FIG. 2 illustrates a mapping between a range of luminance values and a range of colors according to an embodiment of the present invention.

FIG. 2 illustrates a mapping between a range 15 of luminance values and a range 25 of colors according to an embodiment of the present invention. In the example of FIG. 2, the lines representing the ranges 15 and 25 are drawn in parallel and are of equal length; however, this may not actually be the case.

In the present embodiment, the luminance values $L_i$ are each compared to the range 15 of luminance values to determine where they lie in relation to the range 15. In one embodiment, the range 15 is essentially divided into 4 sub-ranges I, II, III and IV. Each sub-range is demarcated by an upper limit and a lower limit; in other words, each sub-range is delimited by a respective upper threshold value. In the example of FIG. 2, sub-range I is delimited by an upper threshold value T1 that is 1/6 the distance between $L_{min}$ and $L_{max}$; sub-range II is delimited by an upper threshold value T2 that is 3/6 the distance between $L_{min}$ and $L_{max}$; sub-range III is delimited by an upper threshold value T3 that is 5/6 the distance between $L_{min}$ and $L_{max}$; and sub-range IV is delimited by an upper threshold value of $L_{max}$. In terms of the minimum and maximum luminance values, $T1=(5L_{min}+L_{max})/6$; $T2=(3L_{min}+3L_{max})/6$; and $T3=(L_{min}+5L_{max})/6$.

To determine which of the sub-ranges the luminance values $L_i$ lie within, each luminance value $L_i$ associated with block 10 (FIG. 1) can be compared to the thresholds T1, T2 and T3 mentioned above. In one embodiment, a three-bit comparison vector 22 is generated based on the results of the comparisons. In such an embodiment, if $L_i$ is less than T1, then $L_i$ is in sub-range I and the comparison vector 22 has a value of (000); if $L_i$ is greater than or equal to T1 but less than T2, then $L_i$ is in sub-range II and the comparison vector 22 has a value of (100); if $L_i$ is greater than or equal to T2 but less than T3, then $L_i$ is in sub-range III and the comparison vector 22 has a value of (110); and if $L_i$ is greater than or equal to T3, then $L_i$ is in sub-range IV and the comparison vector 22 has a value of (111).

Thus, a comparison vector 22 is associated with each luminance value $L_i$. Because each luminance value $L_i$ is associated with (computed from) a set of color component values $R_i$, $G_i$ and $B_i$, by extension a comparison vector 22 is associated with each set of color component values in block 10 (FIG. 1).

Continuing with reference to FIG. 2, each comparison vector 22 is mapped to an index value 28. It may instead be said that each sub-range I, II, III and IV is mapped to an index value 28, or that each comparison vector 22 or each sub-range is mapped to a point on range 25 of colors, and in turn points on range 25 are mapped to index values 28.

In any case, luminance values in sub-range I are mapped to C0, luminance values in sub-range II are mapped to a point in color range 25 that is 1/3 the distance between C0 and C1, luminance values in sub-range III are mapped to a point in color range 25 that is 2/3 the distance between C0 and C1, and luminance values in sub-range IV are mapped to C1. Consequently, because a set of color component values is associated with each luminance value, in effect each set of color component values in block 10 (FIG. 1) is mapped to a point in color range 25. In the present embodiment, there are 4 points in color range 25 and so each point can be represented using 2 bits.

Thus, according to embodiments of the present invention, a set of color component values (a tuple or RGB-tuple) for a texel is used to compute a luminance value, and that luminance value is used to map the set of color component values to an index value. More specifically, the luminance value is compared to a range of luminance values to generate a comparison vector, which in turn is mapped directly to an index value.

In one embodiment, comparison vectors 22 are mapped to index values 28 as follows. A pair of 16-bit palette values, P0 and P1, are computed using C0 and C1 as: $P0=C0_{red}*2048+C0_{green}*32+C0_{blue}$ and $P1=C1_{red}*2048+C1_{green}*32+C1_{blue}$ (that is, the palette values P0 and P1 represent the 16-bit value stored in the RGB565 colors C0 and C1).

In one such embodiment, when the value of P0 is greater than or equal to the value of P1, the values of C0 and C1 are exchanged and the comparison vectors 22 are mapped to the index values 28 using the following table:

| Comparison Vector 22 | Index Value 28 |
|---|---|
| 000 | 01 |
| 100 | 11 |
| 110 | 10 |
| 111 | 00 |

In one such embodiment, when the value of P1 is greater than the value of P0, the comparison vectors 22 are mapped to the index values 28 using the following table:

| Comparison Vector 22 | Index Value 28 |
|---|---|
| 000 | 00 |
| 100 | 10 |
| 110 | 11 |
| 111 | 01 |

There is no change to the values C0 and C1 when P1 is greater than P0.

Thus, the 16 sets of color component values (tuples) in block 10 (FIG. 1) are encoded using C0 and C1 (16 bits each in RGB565 format) and 16 2-bit index values 28. In the present embodiment, a set of color component values encoded as index value (00) is decoded as C0; a set of color component values encoded as index value (10) is decoded as (2C0+01)/3; a set of color component values encoded as index value (11) is decoded as (C0+2C1)/3; and a set of color component values encoded as index value (01) is decoded as C1.

Significantly, the results of an encoding process in accordance with embodiments of the present invention are similar in type and format (though not in content) to the results of conventional encoding processes such as S3TC. That is, for example, both an encoding process in accordance with embodiments of the present invention and a conventional process such as S3TC result in 2 16-bit colors C0 and C1 and 16 2-bit index values, although the values of C0 and C1 and the index values are determined differently and thus are expected to be numerically different as well. Hence, from the point of view of a decoder device, the encoding process is transparent, and thus the encoding process of the present invention is compatible with legacy decoders.

Generally speaking, instead of mapping colors to index values in three dimensions (red, green and blue) of color space, embodiments in accordance with the present invention map colors to index values in one-dimensional luminance space. Furthermore, luminance values are used to select the representative colors C0 and C1, and the representative colors C0 and C1 are selected from a set of colors (that is, they are members of the set of colors and are not calculated from the set of colors). Accordingly, compression performed in accordance with embodiments of the present invention requires less sophisticated processing relative to conventional processes such as S3TC. Consequently, embodiments in accordance with the present invention are less costly in terms of both area and power consumption than conventional processes, and thus may be better suited for use on devices such as portable (e.g., handheld) electronic devices. Also, embodiments in accordance with the present invention can be readily implemented in either hardware or software. In general, embodiments of the present invention provide a less complex compression scheme that, for the human visual system, also results in acceptable image quality.

Although described for texel data, embodiments in accordance with the present invention are not so limited. For example, embodiments in accordance with the present invention can be implemented in pixel shaders or the like. Also, although described for a single block of texel data, the processes described herein can be repeated for multiple blocks of texel data. Moreover, different blocks of texel data can be processed in parallel. Also, one part of a processing pipeline can be operating on one block of texel data while another part of a processing pipeline operates on another block of texel data.

Furthermore, although described for the compression of raw or natural data, embodiments in accordance with the present invention are not so limited. For example, compressed data may be read from a frame buffer, decompressed and used in some manner. Embodiments in accordance with the present invention can be used to recompress the data before it is read back into storage. In general, because the encoded output produced according to embodiments of the present invention is compatible with conventional encoding processes and decoders, and because embodiments in accordance with the present invention can operate on the same type of input data as conventional processes, embodiments in accordance with the present invention can be transparently substituted for a conventional process anywhere compression is performed.

Figure 3:
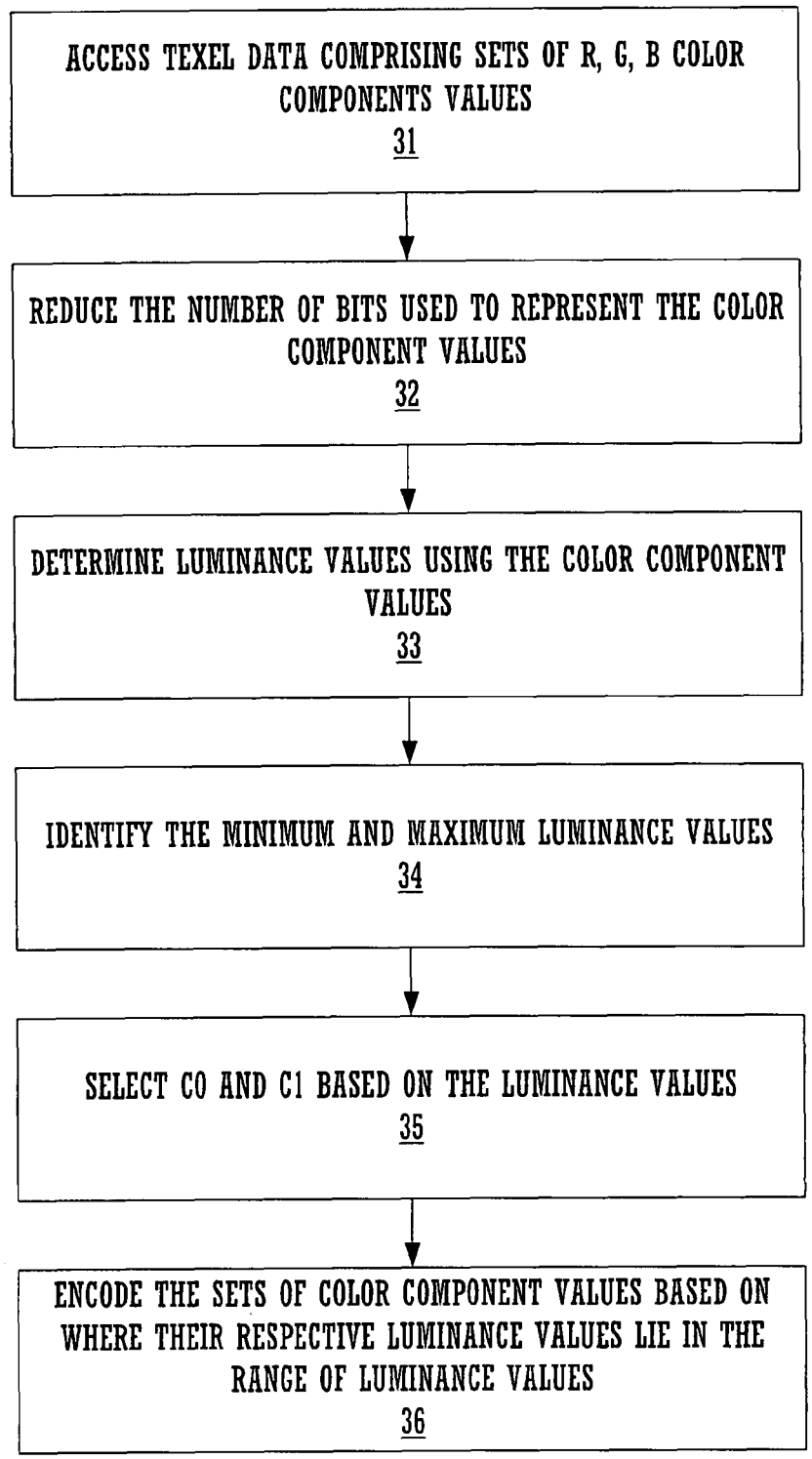
FIG. 3 is a flowchart of a method for processing (e.g., compressing) data according to an embodiment of the present invention.

FIG. 3 is a flowchart 300 of a computer-implemented method for processing (e.g., compressing or encoding) data according to one embodiment of the present invention.

In block 31, data that includes sets of color component values (each set a tuple describing a color) is accessed. In one embodiment, the data is image-based. In one such embodiment, the data includes texel data for a block of texels. In one particular embodiment, the data includes a 4×4 block of texels, and associated with each texel is a set of red, green and blue color component values (an RGB-tuple).

In block 32, in one embodiment, the red, green and blue color component values are represented using 8 bits each. In such an embodiment, the number of bits are reduced by truncating at least 2 least significant bits from each of the 8-bit values.

In block 33, a luminance value is determined from each set of color component values. Thus, a range of luminance values is determined.

In block 34, the minimum and maximum luminance values in the range of luminance values are identified.

In block 35, a first tuple or first set of color component values—from which the minimum luminance value was determined—is selected as the representative color C0, and a second tuple or second set of color component values—from which the maximum luminance value was determined—is selected as the representative color C1. On one embodiment, the colors C0 and C1 are truncated to RGB565 format.

In block 36, each set of color component values is encoded based on where its respective luminance value lies in the range of luminance values that was determined in block 33. In one embodiment, an index value is associated with each set of color component values, depending on where its respective luminance value lies in the range of luminance values. The index value in essence identifies how, during decoding, the representative colors C0 and C1 (described by the aforementioned first and second sets of color component values, respectively) are to be used to reconstruct the encoded sets of color component values. More specifically, during decoding, sets of color component values are interpolated from the representative first and second sets of color component values, and the index values identify how the interpolation is to be performed.

In one embodiment, different thresholds are identified in the range of luminance values, effectively demarcating the range into a number of contiguous sub-ranges. The various luminance values are compared to the threshold values to determine which of the sub-ranges they lie within. In one such embodiment, a unique comparison vector is associated with each of the sub-ranges. The comparison vectors are mapped to a corresponding index value.

Figure 4:
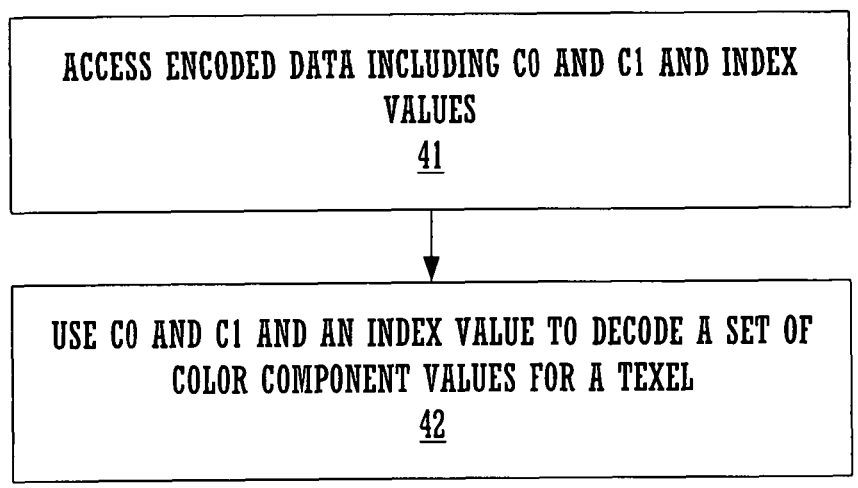
FIG. 4 is a flowchart of a method for processing (e.g., decompressing) data according to an embodiment of the present invention.

FIG. 4 is a flowchart 400 of a computer-implemented method for processing (e.g., decompressing or decoding) data according to one embodiment of the present invention.

In block 41, data that includes an encoded version of sets of color component values for a block of texels is accessed. The encoded version includes a first set of color component values, corresponding to representative color C0, and a second set of color component values, corresponding to representative color C1. The encoded version also includes index values associated with the texels. The encoded version and the index values are determined using the method of encoding data described above in conjunction with FIGS. 1, 2 and 3.

In block 42 of FIG. 4, the representative colors C0 and C1 and an index value associated with a texel are used to decode a third set of color component values that describes a color for the texel. The index value indicates how to interpolate the third set of color component values using C0 and C1. In one embodiment, the third set is decoded as C0 if the index value has a first value, as C1 if the index value has a second value, as (C0+2C1)/3 if the index value has a third value, and as (2C0+C1)/3 if the index value has a fourth value.

Although specific steps are disclosed in flowcharts 300 and 400 of FIGS. 3 and 4, such steps are exemplary. That is, the present invention is well-suited to performing various other steps or variations of the steps recited in flowcharts 300 and 400. It is appreciated that the steps in flowcharts 300 and 400 may be performed in an order different than presented and that the steps in flowcharts 300 and 400 are not necessarily performed in the sequence illustrated.

Figure 5:
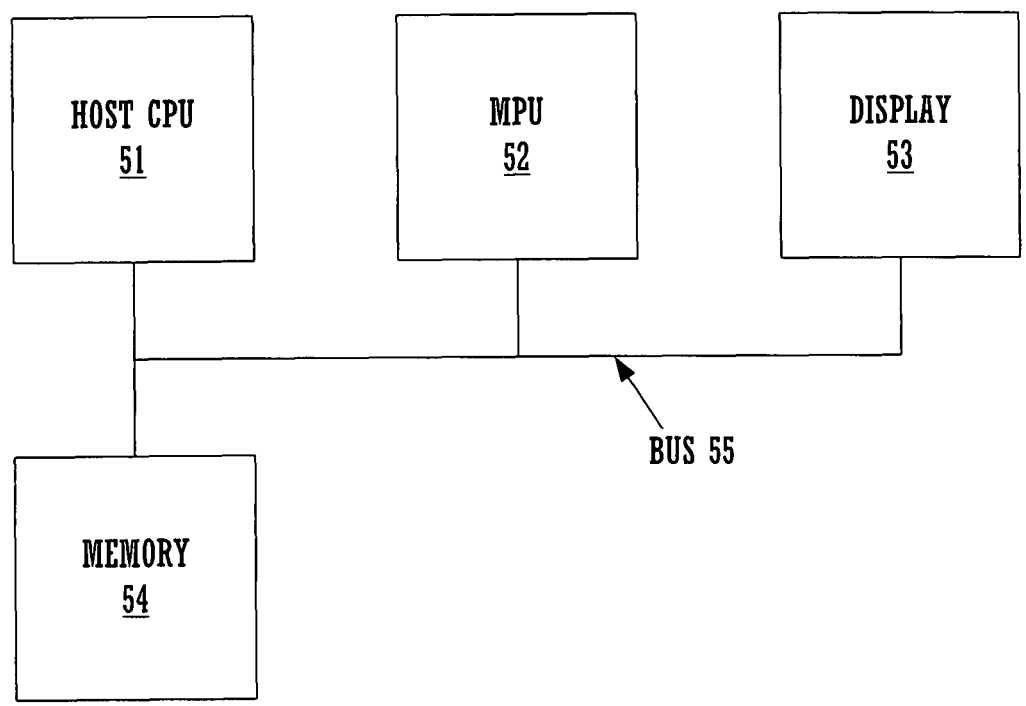
FIG. 5 is a block diagram of one embodiment of a system for compressing data in accordance with the present invention.

FIG. 5 is a block diagram of a system 500 upon which an encoding process in accordance with the present invention, such as that described in flowchart 300 (FIG. 3), can be implemented. In the example of FIG. 5, the system 500 includes a host central processing unit (CPU) 51 coupled to a media (e.g., video or graphics) processor unit (MPU) 52 via a bus 55; alternatively, host CPU 51 provides the functionality provided by MPU 52. Both the CPU 51 and the MPU 52 are coupled to a memory 54 via bus 55. In the system 500 embodiment, the memory 54 is a shared memory, whereby the memory 54 stores instructions and data for both the CPU 51 and the MPU 52. Alternatively, there may be separate memories dedicated to the CPU 51 and MPU 52, respectively. The memory 54 can also include a video frame buffer for storing data (e.g., texel data) that drives a coupled display 53.

As shown in FIG. 5, system 500 includes the basic components of a computer system platform that implements functionality in accordance with embodiments of the present invention. System 500 can be implemented as, for example, a number of different types of portable handheld electronic devices. Such devices can include, for example, portable phones, personal digital assistants (PDAs), handheld gaming devices, or virtually any other type of device with display capability. In such embodiments, components can be included that are designed to add peripheral buses, specialized communications components, support for specialized input/output (I/O) devices, and the like.

Embodiments of the present invention are thus described. While the present invention has been described in particular embodiments, it should be appreciated that the present invention should not be construed as limited by such embodiments, but rather construed according to the below claims.

What is claimed is:

1. A method of compressing texel data, said method comprising:
   accessing data comprising sets of color component values for a plurality of texels, each of said sets describing a color;
   selecting a first set of color component values and a second set of color component values from said sets, wherein said first and second sets define endpoints of a range of colors; and
   encoding a third set of color component values by associating said third set with an index value, wherein said third set is decodable using said first and second sets and said index value.

2. The method of claim 1 wherein each of said color component values is represented using a number of bits and further comprising reducing said number of bits prior to said selecting.

3. The method of claim 1 wherein said selecting comprises determining a range of luminance values using said sets of color component values, wherein said first set corresponds to a first endpoint of said range of luminance values and said second set corresponds to a second endpoint of said range of luminance values.

4. The method of claim 3 wherein said encoding comprises determining a luminance value for said third set, wherein said luminance value is between said first and second endpoints of said range of luminance values and wherein said index value is selected according to where said luminance value lies in said range of luminance values.

5. The method of claim 3 wherein said plurality of luminance values comprises a luminance value for each of said sets of color component values and further comprising determining a luminance value for a set of color component values by computing a dot product of color component values in said set.

6. The method of claim 5 further comprising computing said dot product as 0.299R+0.587G+0.114B where R, G and B are red, green and blue component values in said set.

7. The method of claim 5 further comprising computing said dot product by:
   shifting a red value in said set one bit left to produce a shifted red value;
   shifting a green value in said set two bits left to produce a shifted green value; and
   adding said shifted red value and said shifted green value to a blue value in said set.

8. A method of compressing image-based data, said method comprising:
   accessing data comprising a plurality of sets of color component values;
   determining a plurality of luminance values using said plurality of sets of color component values;
   identifying a minimum and a maximum of said luminance values, wherein said minimum and maximum define endpoints of a range of luminance values, and wherein one endpoint of said range corresponds to a first set of color component values and the other endpoint of said range corresponds to a second set of color component values and; and
   encoding a third set of color component values in said plurality by associating an index value with said third set, wherein said third set is decodable using said first and second sets and said index value.

9. The method of claim 8 wherein each of said color component values is represented using a number of bits and further comprising reducing said number of bits prior to said selecting.

10. The method of claim 8 wherein said plurality of luminance values comprises a luminance value for each of said sets of color component values and further comprising computing a dot product of color component values in a set of color component values to determine a luminance value for said set.

11. The method of claim 10 further comprising computing said dot product as 0.299R+0.587G+0.1146 where R, G and B are red, green and blue component values in said set.

12. The method of claim 10 further comprising computing said dot product by:
   shifting a red value in said set one bit left to produce a shifted red value;
   shifting a green value in said set two bits left to produce a shifted green value; and
   adding said shifted red and green values in said set to a blue value in said set.

13. The method of claim 8 wherein said first and second sets of color component values are selected from said plurality of sets of color component values.

14. A method of processing image-based data, said method comprising:
- accessing data comprising a plurality of sets of color component values;
- determining a plurality of luminance values using said plurality of sets of color component values;
- identifying first and second endpoints of a range of said plurality of luminance values, wherein said first endpoint corresponds to a minimum of said luminance values that is determined using a first set of color component values and wherein said second endpoint corresponds to a maximum of said luminance values that is determined using a second set of color component values; and
- associating an index value with a third set of color component values, wherein said index value is selected by determining where a luminance value for said third set lies in said range of luminance values.

15. The method of claim 14 wherein each of said color component values is represented using a number of bits and further comprising reducing said number of bits prior to said selecting.

16. The method of claim 14 wherein said plurality of luminance values comprises a luminance value for each of said sets of color component values and further comprising determining a luminance value for a set of color component values by computing a dot product of color component values in said set.

17. The method of claim 16 wherein said dot product is computed for said each set of color component values as 0.299R+0.587G+0.1146 where R, G and B are red, green and blue component values in said set.

18. The method of claim 16 further comprising computing said dot product by:
- shifting a red value in said set one bit left to produce a shifted red value;
- shifting a green value in said set two bits left to produce a shifted green value; and
- adding said shifted red and green values in said set to a blue value in said set.

19. The method of claim 14 further comprising:
- identifying thresholds within said range, wherein said thresholds demarcate sub-ranges of luminance values within said range and wherein each of said sub-ranges is associated with a respective index value; and
- comparing said luminance value for said third set to said thresholds to identify a sub-range that includes said luminance value.

20. The method of claim 14 wherein said first and second sets are selected from said plurality of sets of color component values, wherein said third set is decodable using said first and second sets and said index value.

* * * * *